2,876,164

DERMATOLOGICAL PREPARATION CONTAINING DEFATTED SOY BEAN FLOUR

Irving B. Wershaw, New York, N. Y., assignor to Dome Chemicals, Inc., New York, N. Y., a corporation of New York No Drawing. Application August 1, 1957
Serial No. 675,534

10 Claims. (Cl. 167—90)

This invention relates to a dermatological preparation for topical application to the skin. More particularly, this invention relates to a dermatological preparation which may be applied as such (without other added constituents) to the skin or may be applied to the skin as a constituent of a cream, powder, or lotion. All percentages herein are on a weight basis.

It is among the objects of the present invention to provide a dermatological preparation which when added to water produces a colloidal solution having a pH within the range of 4 to 5.5; which preparation is chemically stable, i. e. buffered so that it remains within this pH range which, as is well known, is the preferred pH for healthy skin; which preparation when incorporated in known creams, powders, and lotions containing fats retards oxidation of such fats; which preparation contains protein nutrients; and which preparation can be used to improve the consistency of cosmetic preparations, i. e., acts as a thickener, and in the case of lotions or other liquid containing compounds absorbs and retains such liquids and at the same time imparts thereto certain desirable properties such as buffered pH within the range of 4 to 5.5.

Other objects and advantages of this invention will be apparent from the following detailed description thereof.

I have found that a particular soy bean fraction, namely, one made by dehulling soy beans, i. e. removing the outer skin of the beans and then extracting the dehulled soy beans with an organic fat solvent having a boiling point below 100° C. to remove from the beans drying oils and fats and thereafter milling or grinding the residue or marc to produce colloidal particles, constitutes a valuable constituent of dermatological preparations. This defatted soy bean flour has a chemical composition approximately as follows:

| | Percent |
|---|---|
| Protein | 52.5 |
| Carbohydrate | 30.1 |
| Fat | 0.6 |
| Lecithin | Trace |
| Ash | 6.0 |
| Fibre | 2.8 |
| Moisture | 8.0 |

It is produced, for example, by dehulling soy beans, milling the dehulled soy beans to produce soy bean powder and extracting the powder with a low boiling organic solvent such as ether, chloroform or petroleum benzene to remove fats. The amount of solvent used is not critical as long as it is sufficient to remove the fats present substantially completely. The fat extraction desirably is carried out at room temperature by mixing the soy bean powder with the solvent and then expressing the solvent containing the fats in solution. The solid residue, termed marc, is then milled or ground to colloidal fineness. This fraction thus produced, I have found is useful in dermatological preparations.

The above chemical composition of the soy bean flour, it will be understood, represents one chemical analysis of a specific flour used in making dermatological preparations embodying this invention. This invention, however, is not limited to this particular example. The chemical analysis will, of course, differ somewhat, depending upon the source of the soy bean and the exact procedure followed in processing it. The present invention comprehends the use of colloidal soy bean flour having a protein content of from 40 to 55%, and a carbohydrate content of from 25 to 30% which are the essential constituents. From 4 to 6% ash, from 2 to 3% fiber, from 7 to 8% moisture and small amounts of fat and lecithin constitute the remainder of the flour.

The soy bean flour, hereinabove described, upon changes in atmospheric conditions, tends to decompose and loses its amphoteric property. In accordance with this invention the soy bean flour is stabilized by adding thereto from 5% to 15% based on the weight of soy bean flour of a monocarboxylic, dicarboxylic, or tricarboxylic aliphatic acid containing from 2 to 6 carbon atoms. A chemically stabilized mixture is produced having a pH within the range of 4 to 5.5. In the case of a tricarboxylic acid the amount mixed with the defatted soy bean flour should be about 5% by weight to produce the chemically stabilized mixture having the desired pH. In the case of a dicarboxylic acid the amount used should be about 10% by weight, and for a monocarboxylic acid the amount used should be about 15% by weight to accomplish the desired results, namely, stabilize the soy bean flour and produce a mixture having a pH within the range of from 4 to 5.5.

As the acid mixed with the soy bean flour, acetic, propionic, butyric, tartaric or citric acid may be used. Citric acid is preferred as a general rule because it is readily available and does not impart an unpleasant odor to the preparation in which it is incorporated. Butyric and propionic acids are less desirable because for some purposes their odor is objectionable. However, propionic and butyric acids may be used where the odor is not of controlling importance.

The mixture of soy bean flour and acid may be used as such. For example, a mixture containing 5% of citric acid based on the weight of soy bean flour, will be found to have a pH within the range of 5 to 5.5.

A preferred embodiment of the invention involves the incorporation of the mixture in creams or powders containing other usual constituents, such as emulsifiers, detergents, vitamins, antiseptics and preservatives. When thus incorporated the soy bean flour improves the consistency of the cream, retards oxidation of fats which may be present, and acts as a buffer to maintain the mixture within the desired pH range. In general, when employed in admixture with other constituents, the amount of soy bean flour and acid mixture (in which the acid is present from 5% to 15%, based on the weight of the soy bean flour) may be from about 5% of the total constituents to 95% of the total constituents.

When the preparations are added to water, colloidal solutions result forming a lotion for topical application. When applied dry to the skin the moisture present produces a colloidal solution locally.

The following examples of dermatological preparations embodying this invention are given for purposes of illustration only. It will be understood the invention is not limited to these examples.

EXAMPLE I

Cleansing cream

| Constituents: | Weight percent |
|---|---|
| Carbowax #1540 (polyethylene glycol derivative—thickener) | 5.0 |
| Cetyl alcohol (emulsifier) | 4.0 |
| Stearyl alcohol (emulsifier) | 4.0 |
| Glycerin monostearate (emulsifier and thickener) | 1.00 |
| Paraffin (thickener) | 7.5 |
| White petrolatum (thickener—solubilizer for oil) | 7.5 |
| Defatted soy bean flour | 10.0 |
| Citric acid | 0.5 |
| Sipon L 22 (ammonium lauryl sulfate—detergent) | 50.0 |
| Methyl Paraben (para-hydroxy methyl benzoate—preservative) | 0.2 |
| Water | 10.3 |
| Total | 100.00 |

This cream has a pH of from 5 to 5.5.

EXAMPLE II

Antiseptic powder

| Constituents: | Weight percent |
|---|---|
| Domeboro Powder | 55.0 |
| Polyvinyl pyrrolidine | 1.0 |
| Defatted soy bean flour | 41.8 |
| Citric acid | 2.2 |
| Total | 100.0 |

The Domeboro Powder is a mixture of calcium acetate and aluminum sulfate disclosed in United States Patent 2,371,862; upon addition to water it forms an official Burow's solution. The polyvinyl pyrrolidine acts as an extender for the aluminum acetate formed when the calcium acetate and aluminum sulfate reacts upon addition of the powder to water. The colloidal solution produced upon addition of the powder to water has a pH of from 4 to 5.

EXAMPLE III

Bath meal powder

| Constituents: | Weight percent |
|---|---|
| Polyvinyl pyrrolidine | 2.00 |
| Tween #80 (non-ionic emulsified—polyethylene glycol of sorbitol) | 1.00 |
| Defatted soy bean flour | 92.15 |
| Citric acid | 4.85 |
| Total | 100.00 |

This powder when added to water produces a mixture having a pH of from 4 to 5.

EXAMPLE IV

Cleansing powder containing vitamin A

| Constituents: | Weight percent |
|---|---|
| Crystalets vitamin A (500,000 u./gm.) | 0.36 |
| Duponol C (wetting agent—sodium lauryl sulfate) | 1.00 |
| Titanium dioxide (opaque pigment) | 10.00 |
| Polyvinyl pyrrolidine | 2.00 |
| Defatted soy bean flour | 21.75 |
| Acetic acid | 4.25 |
| Bentonite (detergent and thickener) | 60.64 |
| Total | 100.00 |

EXAMPLE V

Cleansing and antiseptic powder containing vitamin A

| Constituents: | Weight percent |
|---|---|
| Boric acid (antiseptic and preservative) | 5.0 |
| Acacia (binder) | 3.0 |
| Duponol C | 1.0 |
| Polyvinyl pyrrolidine | 2.0 |
| Defatted soy bean flour | 75.9 |
| Citric acid | 4.00 |
| Crystalets vitamin A (500,00 u./gm.) | 9.1 |
| Total | 100.00 |

EXAMPLE VI

Dermatological preparation

| Constituents: | Weight percent |
|---|---|
| Defatted soy bean flour | 85.0 |
| Acetic acid | 15.0 |
| Total | 100.0 |

EXAMPLE VII

Dermatological preparation

| Constituents: | Weight percent |
|---|---|
| Defatted soy bean flour | 90.0 |
| Tartaric acid | 10.0 |
| Total | 100.0 |

EXAMPLE VIII

Dermatological preparation

| Constituents: | Weight percent |
|---|---|
| Defatted soy bean flour | 95.0 |
| Citric acid | 5.0 |
| Total | 100.0 |

All of the above examples had a pH within the range of 4 to 5.5 which remained stable. Substitution of other aliphatic acids such as propionic and butyric for the acids of the examples give substantially the same results except the odor of the products is changed; where the characteristic odors of propionic and butyric acids are not objectionable these acids may be used.

It will be noted that the present invention provides a dermatological preparation which when added to water produces a colloidal solution having a pH within the range of 4 to 5.5. The exact pH within this range will depend upon the acid used to stabilize the soy bean flour and the amount thereof. The preparation is chemically stable and imparts to the skin a pH within the range of 4 to 5.5, which is the preferred pH for healthy skin. When incorporated in creams, powders or lotions it retards oxidation of fats contained therein. It may be used to improve the consistency of cosmetic preparations in that it serves as a thickener, an emulsifier, and an inhibiter for oxidation of fats.

It is intended that all matter contained in the above description shall be interpreted as illustrative and not in a limiting sense.

What is claimed is:

1. A dermatological preparation containing as an essential constituent a stabilized defatted soy bean flour consisting of a mixture of a colloidal soy bean flour having a protein content of from 40% to 55% by weight and a carbohydrate content of from 25% to 30% by weight and from 5% to 15% by weight based on the weight of the soy bean flour of an organic acid containing from 2 to 6 carbon atoms from the group consisting of monocarboxylic, dicarboxylic and tricarboxylic aliphatic acids.

2. A dermatological preparation containing as essential constituents a colloidal defatted soy bean flour containing about 52.5% by weight of proteins, about 31.1% by weight of carbohydrates mixed with from 5% to 15% by weight based on the weight of the soy bean flour of an aliphatic acid containing from 2 to 6 carbon atoms from the group consisting of monocarboxylic, dicarboxylic and tricarboxylic acids.

3. A dermatological preparation containing as its essential constituents a colloidal defatted soy bean flour containing from 40% to 55% by weight of proteins, from 25% to 30% by weight of carbohydrates, and about 5% by weight of citric acid based on the weight of the soy bean flour.

4. A dermatological preparation containing as its essential constituents a colloidal defatted soy bean flour containing from 40% to 55% by weight of proteins, from 25% to 30% by weight of carbohydrates, and about 10% by weight of tartaric acid based on the weight of the soy bean flour.

5. A dermatological preparation containing as its essential constituents a colloidal defatted soy bean flour containing from 40% to 55% by weight of proteins, from 25% to 30% by weight of carbohydrates, and about 15% by weight of acetic acid based on the weight of the soy bean flour.

6. A dermatological cleansing cream containing an emulsifier, thickener, detergent, preservative, water, a defatted soy bean flour containing approximately 52.5% protein and 31.1% carbohydrate and about 5% citric acid based on the weight of the soy bean flour.

7. A dermatological preparation containing 5% to 95% by weight of a mixture consisting of a defatted soy bean flour containing approximately 52.5% protein and 31.5% carbohydrate, said mixture containing from 5% to 15% by weight based on the weight of the soy bean flour of an aliphatic acid containing from 2 to 6 carbon atoms from the group consisting of monocarboxylic, dicarboxylic and tricarboxylic acids, the rest of said preparation consisting of a detergent, emulsifier, and preservative.

8. A dermatological powder for topical application consisting of approximately 55% by weight of a mixture of calcium acetate and aluminum sulfate, 1% by weight of polyvinyl pyrrolidine, 41.8% by weight of colloidal defatted soy bean flour and 2.2% by weight of citric acid.

9. A bath powder consisting of 2% by weight of polyvinyl pyrrolidine, 1% of the polyethylene glycol of sorbitol, 92.15% by weight of colloidal defatted soy bean flour and 4.85% by weight of citric acid.

10. A dermatological powder consisting of vitamin A, detergent, polyvinyl pyrrolidine, colloidal defatted soy bean flour and citric acid, the amount of citric acid and soy bean flour present being from 5% to 95% by weight of said powder and the amount of citric acid present being about 5% by weight of the soy bean flour.

References Cited in the file of this patent
UNITED STATES PATENTS 2,543,467     Renner _____ Feb. 27, 1951

OTHER REFERENCES

Howell: J. Am. Phar. Assn., 1918, pp. 159–163.